Aug. 19, 1958 E. R. ALTSCHUL 2,848,628

TRANSISTOR RING COUNTER

Filed Oct. 6, 1954 2 Sheets-Sheet 1

United States Patent Office 2,848,628

Patented Aug. 19, 1958

2,848,628

TRANSISTOR RING COUNTER

Ernst R. Altschul, New York, N. Y., assignor to Hazeltine Research, Inc., Chicago, Ill., a corporation of Illinois Application October 6, 1954, Serial No. 460,981

13 Claims. (Cl. 307—88.5)

*General*

Figure 1:
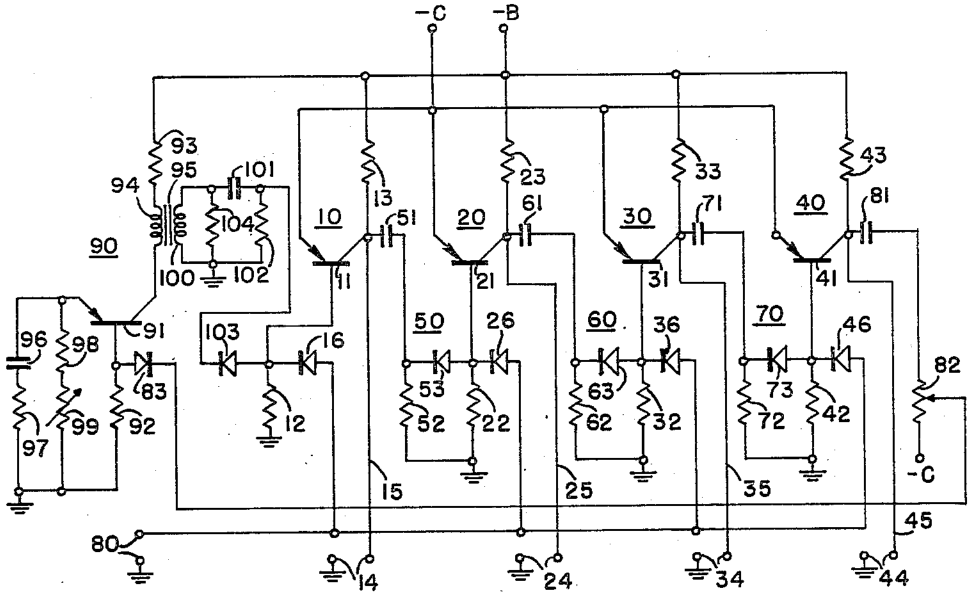

The present invention is directed to electrical counters and, more particularly, to ring counters employing transistors as the counting devices thereof.

A ring counter essentially comprises a plurality of bistable stages which are connected to form a closed loop or ring. Each of these stages is arranged to advance from one state of stability to another in a regular or an irregular timed relation under the control of either periodic or random triggering pulses which are applied simultaneously to various stages of the counter. Output pulses may be derived from one or more of the counter stages and the output pulses derived from any one stage have a frequency which is equal to that of the triggering pulses divided by the total number of stages. Accordingly, a ring counter may be considered as a type of frequency divider. The output pulses derived from one or more of the stages of the ring counter may be employed as timing pulses to control the operation of other electrical devices.

The operation of prior ring counters employing transistor stages has not proved as reliable as desired under some operating conditions. In a transistor ring counter, one of the stages thereof should be in its indicating position or state, that is with the transistor thereof in a state of high-current conduction, while the other stages are in their nonindicating position, that is in a state of low-current conduction which may be effected by the simultaneous application of a triggering pulse to those other stages. The stage which is in the indicating position develops a pulse for application to its succeeding stage and shortly thereafter brings the latter into its indicating position while the stage which was previously in the indicating position returns to its nonindicating position. This step-by-step operation of the successive stages of the ring counter continues throughout each operating cycle of the counter.

When such a ring counter is first placed into operation, it often happens that several of the stages thereof or none of these stages are in the indicating position. Under such circumstances, the ring counter cannot provide proper operation since its output pulses, if any, are not of the proper frequency or recurrence rate. To avoid this difficulty, some prior ring counters have included manually operated switches and associated energizing circuits which at the outset must be connected in the circuit in a given sequence to assure that one stage is always in the indicating position while the other stages are in their nonindicating positions. These manually operated switches and associated circuits are undesirable since their operation may sometimes be overlooked due to carelessness or by inexperienced personnel and this may lead to incorrect operation of the apparatus controlled by the ring counter.

It is an object of the invention, therefore, to provide a new and improved ring counter which avoids one or more of the above-mentioned disadvantages of prior ring counters.

It is another object of the invention to provide a new and improved transistor ring counter which does not require several manual switching procedures when initially placing the counter in operation.

It is a further object of the invention to provide a new and improved transistor ring counter which responds to periodic triggering pulses.

It is an additional object of the invention to provide a new and improved electrical counter which is relatively simple in construction, economical of power consumption, and reliable in operation.

In accordance with a particular form of the invention, an electrical counter comprises $n$ counter stages each having stable indicating and nonindicating states and including a semiconductive body with emitter, collector, and base connections in contact therewith, and circuit means for supplying bias voltages between the emitter and base connections and betwen the collector and base connections. The electrical counter also includes output circuit means coupled to at least one of the aforesaid connections and an input circuit for supplying periodic control pulses simultaneously to one of the connections of each of the aforesaid bodies to condition all of the stages to operate in their nonindicating state. The counter further includes translating means coupling the first through the last of the aforesaid stages in cascade and an astable pulse generator operatively coupled only between the last and the first stages and effective with the translating means to trigger a succeeding stage into an indicating state when a preceding stage is triggered into its nonindicating state, thereby to develop at the output circuit means periodic output pulses having a frequency $$\frac{1}{n}$$

times that of the control pulses.

For a better understanding of the present invention, together with other and further objects thereof, reference is had to the following description taken in connection with the accompanying drawings, and its scope will be pointed out in the appended claims.

Figure 2:
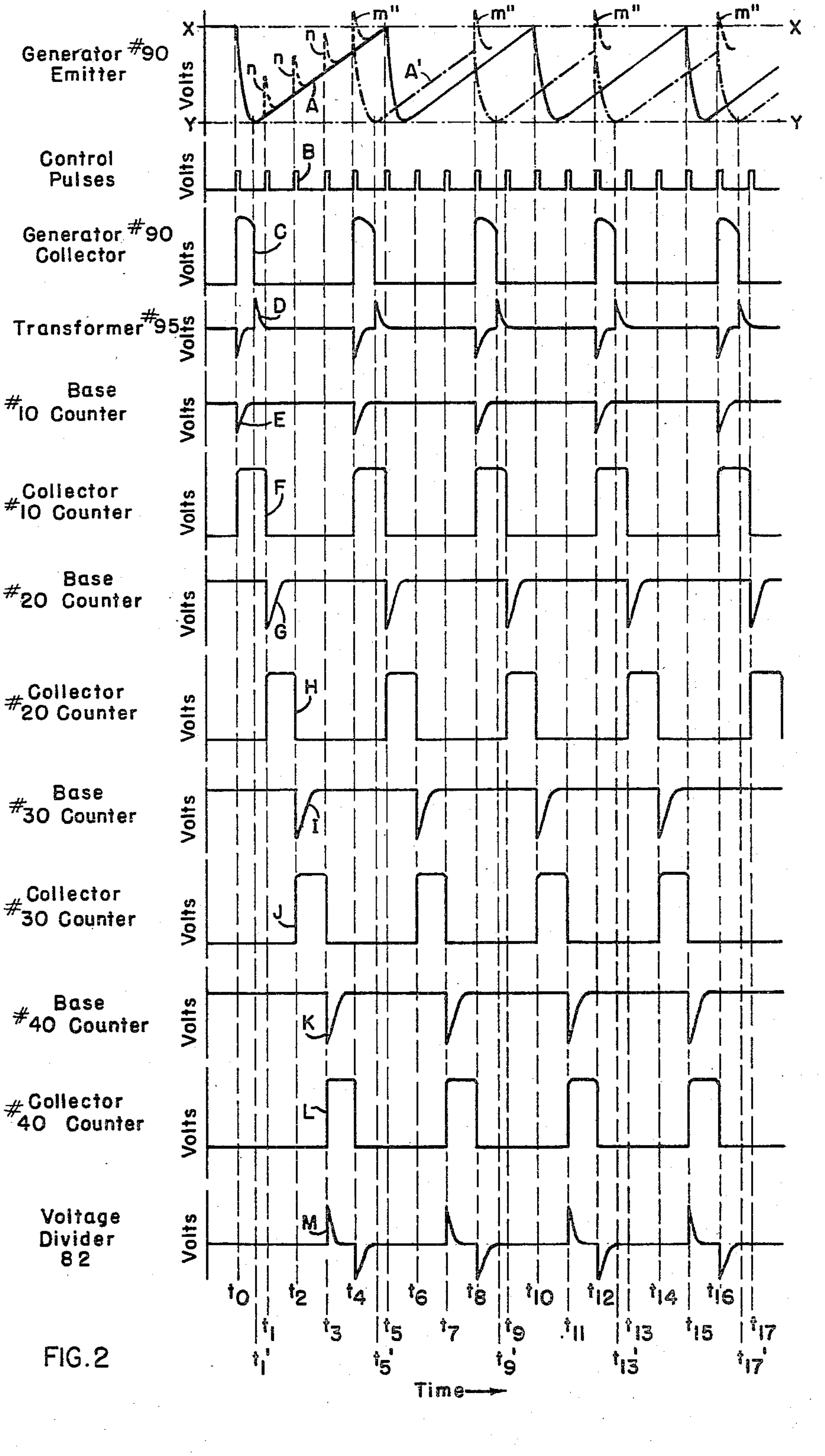

Referring to the drawings:

Fig. 1 is a circuit diagram of an electrical or transistor ring counter in accordance with the present invention, and Fig. 2 is a graph useful in explaining the operation of the ring counter.

*Description of ring counter of Fig. 1*

Referring now to Fig. 1 of the drawings, there is represented a transistor ring counter comprising $n$ counter stages ($n$ being an integer) each having stable indicating and nonindicating states and including a semiconductive body with emitter, collector, and base connections in contact therewith, and circuit means for supplying bias voltages between the emitter and base connections and between the collector and the base connections. For the purposes of illustration, the Fig. 1 embodiment includes four counter stages 10, 20, 30, and 40, although it will be understood that any convenient number of stages may be employed depending upon the requirements of the apparatus (not shown) controlled by the ring counter. The circuits just mentioned include semiconductive bodies 11, 21, 31, and 41 of suitable material, such as germanium, each body being provided with emitter, collector, and base connections in operative contact therewith. These bodies and their connections comprise well-known current-multiplication transistors and may, for example, be N-germanium point-contact transistors. The emitter connections of the transistor counter stages 10, 20, 30, and 40 are connected in parallel to a low-impedance circuit means in the form of a battery —C, one terminal of which is grounded, for supplying bias voltages in the reverse direction between the emitter and base connections. The base connections of the transistor stages 10, 20, 30, and 40 are preferably connected to ground through impedance elements in the form of resistors 12, 22, 32, and 42 while the collector connections are connected to a biasing source indicated as —B through collector or load resistors 13, 23, 33, and 43, respectively. The source —B serves to supply a reverse bias between the collector and base connections. By being biased in the reverse direction, it is meant that the transistor is biased in its direction of poor conductivity. The values of the collector resistors are preferably higher than those of the base resistors and the latter, which are very high with respect to the resistances of the emitter circuits, are effective to produce in their respective transistors a region of negative resistance. The selected collector resistor values are such that the transistors operate in either of the two stable states.

The electrical counter also includes output circuit means coupled to at least one of the connections, specifically, the collector connection of one of the transistors. When the device of the present invention is employed as a ring counter, as represented by Fig. 1 of the drawings, it includes output circuit means coupled to each of the collector connections. These means comprise the output terminals 14, 14, 24, 24, and 34, 34, and 44, 44 and the conductors 15, 25, 35, and 45 connected, respectively, between the ungrounded one of the last-mentioned terminals and the collector connections of the transistor stages 10, 20, 30, and 40.

The ring counter further includes an input circuit for supplying periodic positive polarity control pulses simultaneously to one of the described connections of each of the semiconductive bodies 11, 21, 31, and 41, namely, to the base connections thereof, to condition all of the counter stages to operate in their non-indicating state. As is well understood in the ring counter art, the non-indicating state for a transistor counter stage is when it is in a stable state of low-current conduction while the indicating state is when it is in a high-current conducting state. This input circuit includes a pair of input terminals 80, 80, the ungrounded one of which is coupled to individual connections, specifically, the base connections of the transistor stages 10, 20, 30, and 40 through unidirectionally conductive devices in the form of crystal rectifiers 16, 26, 36, and 46 which, when nonconductive, serve to isolate the base connections from any pulse source which may be coupled to the terminals just mentioned.

The ring counter additionally includes translating means including pulse-shaping networks coupling the first through the last of the transistor stages 10, 20, 30, and 40 in cascade. More particularly, this translating means includes individual coupling networks 50, 60, and 70 which couple the collector connections of the stages 10, 20, and 30 to the base connections of the stages 20, 30, and 40, respectively. These networks are similar in construction and a description of one thereof will suffice. The network 50 includes a differentiating means comprising a condenser 51 and a resistor 52 connected in cascade with a unidirectionally conductive device or crystal rectifier 53 between the collector of the counter 10 and the base of counter 20. Rectifier 53 is poled so as to translate only negative polarity pulses.

The ring counter further includes an astable pulse generator, preferably a transistor multivibrator-type pulse generator 90 having a free-running frequency less than $$\frac{1}{n}$$

times that of the control pulses applied to the terminals 80, 80 (that is, one-fourth thereof for the represented embodiment). This generator is operatively coupled only between the collector connection of the last stage 40 and the base connection of the first stage 10 and is effective, with the translating means 50, 60, and 70, to develop at the various base connections negative polarity pulses to trigger a succeeding stage into an indicating state when a preceding stage is triggered into its nonindicating state, thereby to develop at the output terminals 14, 14, 24, 24, 34, 34, and 44, 44 periodic output pulses having a frequency one-fourth that of the control pulses. This transistor pulse generator includes a semiconductive body 91 with its base connection coupled to ground through a base resistor 92 and its collector connection coupled to the source —B through a series combination of the primary winding 94 of a transformer 95 and the collector resistor 93. The emitter connection is coupled to ground through the combination of a series-connected condenser 96 and a resistor 97 which, in turn, are coupled in shunt with a fixed resistor 98 and an adjustable frequency-controlling resistor 99.

The transformer 95 in the collector circuit of the pulse generator 90 includes a secondary winding 100 having a differentiating circuit 101, 102 connected across the terminals thereof and a damping resistor 104 connected in shunt with the differentiating circuit. The differentiating circuit 101, 102 is coupled to the base connection of the first counter stage 10 through a crystal rectifier device 103 which is so poled as to translate negative polarity pulses. The collector connection of the fourth counter stage 40 is coupled to the base connection of the pulse generator 90 through a pulse-shaping network comprising a differentiating circuit 81, 82 and a rectifier device 83 which is poled to translate negative polarity pulses. The resistor 82 of the differentiating circuit 81, 82 comprises a voltage divider having one terminal connected to a negative potential source —C and its adjustable tap connected to the crystal rectifier device 83 for applying to the latter a selectable portion of the potential developed at the collector connection of the counter stage 40.

*Operation of ring counter of Fig. 1*

In considering the operation of the ring counter, it will be assumed that when the counter is first placed in operation at a time corresponding to the time $t_0$ of Fig. 2, each of the counter stages 10, 20, 30, and 40 is in a nonindicating condition. It will be recalled that for a ring counter to perform correctly, it should commence operation or very quickly be placed in an operating condition wherein only one of the counter stages is momentarily in its indicating condition and the other stages are in their nonindicating states. It will also be assumed that the parameters of the transistor ring counters 10, 20, 30, and 40 are such that when they are in their nonindicating or low-current conductivity state, the base connections thereof are somewhat positive with reference to their corresponding emitter connections because the emitter connections are connected to the negative potential source —C and one terminal of the base resistors 12, 22, 32, and 42 is grounded. It will further be assumed that beginning at time $t_0$ a series of periodic positive polarity control pulses, which are to be counted and are represented by curve B of Fig. 2 are applied by the terminals 80, 80 through the crystal rectifier devices 16, 26, 36, and 46 to the base connections of the counters 10, 20, 30, and 40. For convenience of representation and understanding, it will also be assumed that at time $t_0$ the potential of the emitter connection of the transistor multivibrator-type pulse generator 90 decreases abruptly in an exponential manner from a negative potential level X—X to the more negative potential level Y—Y as represented by the solid-line curve A of Fig. 2 and then at time $t_1'$ gradually becomes less negative until it reaches the X—X level at about time $t_5$. Thereafter, the wave form at the emitter connection of pulse generator 90 repeats itself during the intervals $t_5$–$t_{10}$ and $t_{10}$–$t_{15}$. Solid-line curve A represents the wave form developed at the emitter connection of generator 90 when it is operating at its free-running frequency, which condition prevails if no negative control pulses are applied through the rectifier device 83 to the base connection of the pulse generator.

At time $t_0$ the collector current increases and the potential of the collector connection of the generator 90 experiences a positive excursion and then decreases slightly until time $t_1'$ whereupon it drops sharply to its original value. As a result of the action of the transformer 95 and the differentiating circuit 101, 102, there is derived at the output terminal of the differentiating circuit for application to the rectifier device 103 a pair of pulses as represented by curve D of Fig. 2. Device 103 is so poled that it does not translate the applied positive polarity pulses but is effective to apply the negative pulse, developed at time $t_0$ and represented by curve E, to the base connection of the first counter stage 10. This negative polarity pulse applied to the base connection of the first stage 10 at time $t_0$ has a greater negative swing than the positive excursion of the pulse of curve B applied at instant $t_0$ through the rectifier 16 to that base connection and the first-mentioned pulse triggers the stage 10 into its indicating state or condition of high collector-current conductivity, thereby causing the collector connection to experience, at time $t_0$, a positive rise as represented by curve F of Fig. 2 to a less negative level. The positive polarity pulses applied by terminals 80, 80 to each of the base connections of the counter stages 20, 30, and 40 are ineffective to alter their operation since, as previously mentioned, these stages are in their nonindicating states. This less negative potential is maintained at the collector connection until time $t_1$ when the second positive polarity pulse of curve B is applied by the terminals 80, 80 through the rectifier device 16 to the base connection of counter stage 10, thereby returning the latter to its nonindicating state. Thus, it will be seen that during the interval $t_0$–$t_1$ the negative polarity control pulse of curve E applied to the base connection of the first counter stage 10 is effective to place it in an indicating state while the remaining stages are in a nonindicating state, which condition is effective to cause the ring counter to operate properly thereafter as will be demonstrated hereinafter.

The positive-going pulse developed at the collector connection of the first stage 10 is differentiated by the differentiating circuit 51, 52 of the pulse-shaping network 50 and the negative polarity pulse, represented by curve G, is translated by rectifier device 53 and applied to the base connection of the second counter stage 20. As represented, this negative polarity pulse has a greater amplitude than the control pulse applied at time $t_1$ to the base connection under consideration and is effective to increase the flow of collector current and cause the collector potential to have a positive rise at time $t_1$ to a less negative value as represented by curve H of Fig. 2. Counter stage 20 is then operating in its indicating state and the other stages are assured of being in their nonindicating state as a result of the positive polarity disabling pulses of curve *B* applied to the base connections of these other stages at time $t_1$. At time $t_2$ a positive polarity control pulse applied to the base connection of stage 20 from the terminals 80, 80 returns the counter to its stable nonindicating state wherein the collector potential decreases abruptly as represented by curve H. Stages 10, 30, and 40 are assured of being in their nonindicating state by the positive polarity control pulses applied by terminals 80, 80 to the base connections of those counters.

In the manner previously described in connection with the pulse-shaping network 50, the pulse-shaping network 60 between the counters 20 and 30 responds to the collector pulse of curve H and derives the negative polarity pulse of curve I for application to the base connection of stage 30, thereby placing it in its indicating state and developing the collector pulse represented by curve J at time $t_2$—$t_3$. In a similar manner, the pulse-shaping network 70 responds to the pulse J and derives the negative pulse of curve K for application at time $t_3$ to the base connection of the fourth stage 40. This stage is placed on its indicating condition at time $t_3$—$t_4$ while at time $t_3$ the control pulses from terminals 80, 80 assure that stages 10, 20, and 30 are in their stable nonindicating condition.

The positive-going pulse of curve L developed at the collector connection of the counter stage 40 is differentiated by the circuit 81, 82 and a selected portion of this differentiated voltage is applied by the voltage divider 82 to the rectifier device 83 connected to the base connection of generator 90. Since this base connection operates at a somewhat lower negative potential than that appearing at the adjustable tap of the voltage divider 82, the rectifier 83 is normally nonconductive and the positive-going pulse of curve M appearing at time $t_3$ is not applied to the base connection of the pulse generator 90. However, the negative-going pulse developed at time $t_4$ at the tap of the voltage divider 82 renders the device 83 conductive and applies that pulse to the base connection of generator 90. At time $t_4$ this pulse increases the flow of base current in the pulse generator 90 and may be considered as the equivalent of a positive-going pulse which is applied to the emitter connection of generator 90, which equivalent pulse is represented as being superimposed on the sloping region of curve A at $t_4$ by the broken line pulse $m''$. It will be seen that this last-mentioned pulse has an amplitude which extends above the emitter-voltage threshold level X—X of the generator. The effective potential appearing at the emitter connection at time $t_4$ suddenly triggers the astable multivibrator pulse generator 90 and causes its emitter voltage at time $t_4$ to decrease exponentially and reach the level Y—Y at time $t_5$ as represented by the dot-dash line curve A'. The collector voltage of generator 90 experiences a positive rise at time $t_4$ and a positive-going pulse is developed at the collector connection during the interval $t_4$—$t_5'$ as represented by curve C of Fig. 2.

In the manner previously mentioned, the transformer 95, the differentiating circuit 101, 102, and the rectifier device 103 derive at time $t_4$ the negative polarity pulse of curve E for application to the base connection of the first counter stage 10. This again places that stage in its indicating state and the control pulse appearing at time $t_4$ of curve B assures that the other stages are in their nonindicating condition. At time $t_5$ the pulse translated from the collector connection to stage 10 to the base connection of stage 20 places it in its indicating condition and stage 10 returns to its nonindicating condition. The described cycle of operation is repeated wherein the counter stage in a state of stable high-current conduction causes the succeeding stage to be advanced to a condition of high-current conduction and the remaining stages are maintained in a state of low-current conduction. Thus, the transistor ring counter is effective to develop at the output terminals 14, 14 a series of positive-going pulses represented by curve F of Fig. 2 while the terminals 24, 24, 34, 34, and 44, 44 are effective to have developed thereat the delayed series of pulses represented, respectively, by curves H, J, and L. Each series of output pulses has a frequency $$\frac{1}{n}$$

or one-fourth that of the control pulses applied to terminals 80, 80.

By a similar graphical analysis, it may be shown that if two or more of the counter stages of the ring counter are in their indicating states, the ring counter is conditioned to operate correctly, that is, with only one stage in its indicating state and the others in their nonindicating state within one or two complete cycles of the ring counter. When two or more stages are in an indicating state at the outset, negative control pulses are applied through the rectifier device 83 to the base connection of the pulse generator 90 at a faster rate than is indicated for the pulses *m'* of curve M of Fig. 2 and these more numerous pulses may, in effect, be considered as positive-going pulses applied to the emitter connection of generator 90. Such pulses are represented by the dotted-line pulses *n* in the initial portion of curve A of Fig. 2. Since these extend below the threshold level X—X for the emitter connection of the generator 90, they do not cause the later to develop a collector pulse until such time as interval $t_4$—$t_5'$, which pulse is represented by curve C of Fig. 2.

In addition to automatically providing a correct counting operation when the device is turned on, the ring counter of Fig. 1 possesses other advantages. Only one active stage, that is, a stage in its indicating condition, is required into the ring counter at any given instant and this is the only stage which is drawing full current at any one time after a few cycles of operation of the counter. Neglecting the very small current drawn by its transistor while it is in its nonindicating or off state, the current required by the ring counter is, therefore, independent of the number of stages therein. For some applications wherein a large number of stages are required and large power supplies are not available, this is an important advantage. Experience has indicated that bistable transistor circuits may be triggered on and off when the resistance of the emitter circuit is as low as possible and the trigger pulses are applied to the base connection. The present ring counter is able fully to exploit this characteristic of such circuits. Operating adjustments of the Fig. 1 transistor ring counter are not particularly critical.

While applicant does not wish to be limited to any particular circuit values for the embodiment of the invention described above, there follows a set of representative values which may be used in the transistor ring counter of Fig. 1.

| | |
|---|---|
| Resistors **12, 22, 32, 42** | 1.8 kilohms. |
| Resistors **13, 23, 33** | 6.8 kilohms. |
| Resistors **43, 92, 102** | 8.2 kilohms. |
| Resistors **52, 62, 72** | 15 kilohms. |
| Resistor **82** | 10 kilohms (max.). |
| Resistor **93** | 820 ohms. |
| Resistor **97** | 270 ohms. |
| Resistor **98** | 27 kilohmns. |
| Resistor **99** | 1 megohm (max.). |
| Condensers **51, 61, 71, 101** | 0.001 microfarad. |
| Condenser **81** | 0.02 microfarad. |
| Condenser **96** | 0.1 microfarad. |
| Transistors **10, 20, 30, 40, 90** | Western Electric M–1689 germanium point contact. |
| Crystal rectifiers **16, 26, 36, 46, 53, 63, 73, 83, 103** | CK–713 Raytheon. |
| Transformer **95** | Ferrite core unit with windings having 1/1 turns ratio. |
| —C | —3 volts. |
| —B | —45 volts. |
| Control pulses to terminals **80, 80** | 152 per second. |
| Amplitude | About 8 volts. |
| Duration | About 5 microseconds. |
| Output pulses | 38 per second. |
| Amplitude | About 25 volts. |

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electrical counter comprising: *n* counter stages each having stable indicating and nonindicating states and including a semiconductive body with emitter, collector, and base connections in contact therewith, and circuit means for supplying bias voltages between said emitter and base connections and between said collector and base connections; output circuit means coupled to at least one of said connections; an input circuit for supplying periodic control pulses simultaneously to one of said connections of each of said bodies to condition all of said stages to operate in said nonindicating state; translating means coupling the first through the last of said stages in cascade; and an astable pulse generator operatively coupled only between said last and said first stages and effective with said translating means to trigger a succeeding stage into an indicating state when a preceding stage is triggered into its nonindicating state, thereby to develop at said ouput circuit means periodic output pulses having a frequency $$\frac{1}{n}$$

times that of said control pulses.

2. An electrical counter comprising: *n* counter stages each having stable indicating and nonindicating states and including a semiconductive body with emitter, collector, and base connections in contact therewith, and circuit means for supplying bias voltages in the reverse direction between said emitter and base connections and between said collector and base connections; output circuit means coupled to at least one of said connections; an input circuit for supplying periodic control pulses simultaneously to one of said connections of each of said bodies to condition all of said stages to operate in said nonindicating state; translating means coupling the first through the last of said stages in cascade; and an astable pulse generator operatively coupled only between said last and said first stages and effective with said translating means to trigger a succeeding stage into an indicating state when a preceding stage is triggered into its nonindicating state, thereby to develop at said output circuit means periodic output pulses having a frequency $$\frac{1}{n}$$

times that of said control pulses.

3. An electrical counter comprising: *n* counter stages each having stable indicating and nonindicating states and including a semiconductive body with emitter, collector, and base connections in contact therewith, low-impedance circuit means for supplying bias voltages in the reverse direction between said emitter and base connections, and circuit means for supplying bias voltages in said direction between said collector and base connections; output circuit means coupled to at least one of said connections; an input circuit for supplying periodic control pulses simultaneously to one of said connections of each of said bodies to condition all of said stages to operate in said nonindicating state; translating means coupling the first through the last of said stages in cascade; and an astable pulse generator operatively coupled only between said last and said first stages and effective with said translating means to trigger a succeeding stage into an indicating state when a preceding stage is triggered into its nonindicating state, thereby to develop at said output circuit means periodic output pulses having a frequency $$\frac{1}{n}$$

times that of said control pulses.

4. An electrical counter comprising: $n$ counter stages each having stable indicating and nonindicating states and including a semiconductive body with emitter, collector, and base connections in contact therewith and with base and collector impedance elements therefor, and circuit means for supplying bias voltages between said emitter and base connections and between said collector and base connections; output circuit means coupled to at least one of said connections; an input circuit for supplying periodic control pulses simultaneously to one of said connections of each of said bodies to condition all of said stages to operate in said nonindicating state; translating means coupling the first through the last of said stages in cascade; and an astable pulse generator operatively coupled only between said last and said first stages and effective with said translating means to trigger a succeeding stage into an indicating state when a preceding stage is triggered into its nonindicating state, thereby to develop at said output circuit means periodic output pulses having a frequency $$\frac{1}{n}$$

times that of said control pulses.

5. An electrical counter comprising: $n$ counter stages each having stable indicating and nonindicating states and including a semiconductive body with emitter, collector, and base connections in contact therewith, and circuit means for supplying bias voltages between said emitter and base connections and between said collector and base connections; output circuit means coupled to at least one of said collector connections; an input circuit for supplying periodic control pulses simultaneously to one of said connections of each of said bodies to condition all of said stages to operate in said nonindicating state; translating means coupling the first through the last of said stages in cascade; and an astable pulse generator operatively coupled only between said last and said first stages and effective with said translating means to trigger a succeeding stage into an indicating state when a preceding stage is triggered into its nonindicating state, thereby to develop at said output circuit means periodic output pulses having a frequency $$\frac{1}{n}$$

times that of said control pulses.

6. An electrical counter comprising: $n$ counter stages each having stable indicating and nonindicating states and including a semiconductive body with emitter, collector, and base connections in contact therewith, and circuit means for supplying bias voltages between said emitter and base connections and between said collector and base connections; output circuit means coupled to at least one of said connections; an input circuit for supplying periodic control pulses simultaneously to one of said connections of each of said bodies to condition all of said stages to operate in said nonindicating state; translating means coupling the first through the last of said stages in cascade; and an astable pulse generator having a free-running frequency less than that of said control pulses operatively coupled only between said last and said first stages and effective with said translating means to trigger a succeeding stage into an indicating state when a preceding stage is triggered into its nonindicating state, thereby to develop at said output circuit means periodic output pulses having a frequency $$\frac{1}{n}$$

times that of said control pulses.

7. An electrical counter comprising: $n$ counter stages each having stable indicating and nonindicating states and including a semiconductive body with emitter, collector, and base connections in contact therewith, and circuit means for supplying bias voltages between said emitter and base connections and between said collector and base connections; output circuit means coupled to at least one of said connections; an input circuit for supplying periodic control pulses simultaneously to one of said connections of each of said bodies to condition all of said stages to operate in said nonindicating state; translating means coupling the first through the last of said stages in cascade; and an astable pulse generator having a free-running frequency less than $$\frac{1}{n}$$

times that of said control pulses operatively coupled only between said last and said first stages and effective with said translating means to trigger a succeeding stage into an indicating state when a preceding stage is triggered into its nonindicating state, thereby to develop at said output circuit means periodic output pulses having a frequency $$\frac{1}{n}$$

times that of said control pulses.

8. An electrical counter comprising: $n$ counter stages each having stable indicating and non-indicating states and including a semiconductive body with emitter, collector, and base connections in contact therewith, and circuit means for supplying bias voltages between said emitter and base connections and between said collector and base connections; output circuit means coupled to at least one of said connections; an input circuit for supplying periodic control pulses simultaneously to one of said connections of each of said bodies to condition all of said stages to operate in said nonindicating state; translating means coupling the first through the last of said stages in cascade; and an astable transistor pulse generator operatively coupled only between the collector connection of said last stage and the base connection of said first stage and effective with said translating means to trigger a succeeding stage into an indicating state when a preceding stage is triggered into its nonindicating state, thereby to develop at said output circuit means periodic output pulses having a frequency $$\frac{1}{n}$$

times that of said control pulses.

9. An electrical counter comprising: $n$ counter stages each having stable indicating and non-indicating states and including a semiconductive body with emitter, collector, and base connections in contact therewith, and circuit means for supplying bias voltages between said emitter and base connections and between said collector and base connections; output circuit means coupled to at least one of said connections; an input circuit for supplying periodic control pulses simultaneously to said base connections of each of said bodies to condition all of said stages to operate in said nonindicating state; translating means coupling the first through the last of said stages in cascade; and an astable pulse generator operatively coupled only between said last and said first stages and effective with said translating means to trigger a succeeding stage into an indicating state when a preceding stage is triggered into its nonindicating state, thereby to develop at said output circuit means periodic output pulses having a frequency $$\frac{1}{n}$$

times that of said control pulses.

10. An electrical counter comprising: $n$ counter stages each having stable indicating and nonindicating states and including a semiconductive body with emitter, collector, and base connections in contact therewith, and circuit means for supplying bias voltages between said emitter and base connections and between said collector and base connections; output circuit means coupled to at least one of said connections; an input circuit for supplying periodic control pulses simultaneously to one of said connections of each of said bodies to condition all of said stages to operate in said nonindicating state; translating means including in cascade differentiating means and unidirectionally conductive means coupling the first through the last of said stages in cascade; and an astable pulse generator operatively coupled only between said last and said first stages and effective with said translating means to trigger a succeeding stage into an indicating state when a preceding stage is triggered into its nonindicating state, thereby to develop at said output circuit means periodic output pulses having a frequency $$\frac{1}{n}$$

times that of said control pulses.

11. An electrical counter comprising: $n$ counter stages each having stable indicating and nonindicating states and including a semiconductive body with emitter, collector, and base connections in contact therewith, and circuit means for supplying bias voltages between said emitter and base connections and between said collector and base connections; output circuit means coupled to at least one of said connections; an input circuit for supplying periodic control pulses simultaneously to one of said connections of each of said bodies to condition all of said stages to operate in said nonindicating state; translating means including $n$ pulse-shaping networks coupling the first through the last of said stages in cascade; a pulse-shaping network; and an astable pulse generator operatively coupled only between said last and said first stages through said last-mentioned network and effective with said translating means to trigger a succeeding stage into an indicating state when a preceding stage is triggered into its nonindicating state, thereby to develop at said output circuit means periodic output pulses having a frequency $$\frac{1}{n}$$

times that of said control pulses.

12. An electrical counter comprising: $n$ counter stages each having stable indicating and non-indicating states and including a semiconductive body with emitter, collector, and base connections in contact therewith and with base and collector impedance elements therefor, and circuit means for supplying bias voltages in the reverse direction between said emitter and base connections and between said collector and base connections; output circuit means coupled to at least one of said collector connections; an input circuit for supplying periodic positive polarity control pulses simultaneously to said base connections of each of said bodies to condition all of said stages to operate in said nonindicating state; translating means coupled between the collector connections of each of the first through the next to the last of said stages and the base connections of each of the second through the last of said stages; and an astable pulse generator operatively coupled only between the collector connection of said last stage and the base connection of said first stage and effective with said translating means to develop at said base connections negative polarity pulses to trigger a succeeding stage into an indicating state when a preceding stage is triggered into its nonindicating state, thereby to develop at said output circuit means periodic output pulses having a frequency $$\frac{1}{n}$$

times that of said control pulses.

13. A transistor ring counter comprising: $n$ counter stages each having stable indicating and non-indicating states and including a semiconductive body with emitter, collector, and base connections in contact therewith and with base and collector impedance elements therefor, and circuit means for supplying bias voltages in the reverse direction between said emitter and base connections and between said collector and base connections; output circuit means coupled to at least one of said connections; an input circuit for supplying periodic positive polarity control pulses simultaneously to said base connections of each of said bodies to condition all of said stages to operate in said nonindicating state; translating means, including in cascade differentiating means and rectifier means poled to translate negative polarity pulses, coupled between the collector connections of each of the first through the next to the last of said stages and the base connections of each of the second through the last of said stages; and an astable transistor pulses generator operatively coupled only between the collector connection of said last stage and the base connection of said first stage and effective with said translating means to develop at said base connections negative polartity pulses to trigger a succeeding stage into an indicating state when a preceding stage is triggered into its nonindicating state, thereby to develop at said output circuit means periodic output pulses having a frequency $$\frac{1}{n}$$

times that of said control pulses.

References Cited in the file of this patent

UNITED STATES PATENTS

| | | |
|---|---|---|
| 2,536,035 | Cleeton | Jan. 2, 1951 |
| 2,594,336 | Mohr | Apr. 29, 1952 |
| 2,614,141 | Edson et al. | Oct. 14, 1952 |
| 2,655,607 | Reeves | Oct. 13, 1953 |
| 2,644,897 | Lo | July 7, 1953 |
| 2,703,368 | Wrathall | Mar. 1, 1955 |